United States Patent [19]

Gruber et al.

[11] 3,984,385

[45] Oct. 5, 1976

[54] ANAEROBICALLY HARDENING ADHESIVES AND SEALANTS CONTAINING A HYDRAZIDE ACCELERATOR

[75] Inventors: Werner Gruber, Dusseldorf-Gerresheim; Joachim Galinke, Dusseldorf-Holthausen; Jurgen Keil, Monheim-Hitdorf, all of Germany

[73] Assignee: Henkel & Cie G.m.b.H., Dusseldorf-Holthausen, Germany

[22] Filed: Aug. 25, 1975

[21] Appl. No.: 607,464

[30] Foreign Application Priority Data

Sept. 2, 1974 Germany............................ 2441918

[52] U.S. Cl.............................. 526/217; 260/42.44; 260/884; 260/885; 260/886; 428/463; 526/219; 526/230; 526/328
[51] Int. Cl.² .................................... C08F 120/14
[58] Field of Search ................. 260/89.5 R, 89.5 A, 260/86.1 E

[56] References Cited

UNITED STATES PATENTS

| | | | |
|---|---|---|---|
| 3,625,930 | 12/1971 | Toback et al. | 260/89.5 R |
| 3,775,385 | 11/1973 | Ozono et al. | 260/89.5 A |

Primary Examiner—Harry Wong, Jr.
Attorney, Agent, or Firm—Hammond & Littell

[57] ABSTRACT

Organic sulfonic acid hydrazides are accelerators for aerostable anaerobically-setting adhesive compositions. They can be used with stabilizers. Preferred hydrazides of this group are the aryl sulfonic acid hydrazides, for example benzene sulfonic acid hydrazide. These provide rapid setting time with good ultimate strength, and have little adverse effect on the storage stability of the compounds when access of air is permitted.

15 Claims, No Drawings

ANAEROBICALLY HARDENING ADHESIVES AND SEALANTS CONTAINING A HYDRAZIDE ACCELERATOR

FIELD OF THE INVENTION

The present invention relates to systems based on (meth) acrylic esters and organic peroxides, particularly hydroperoxides, which harden in the absence of molecular oxygen at an accelerated rate, and which are known as aerostable anaerobically setting adhesives, sealing compounds, etc. They are used preferably in solvent-free form for the above-mentioned purposes the invention includes methods for the preparation of the compositions.

As essential commponents these systems contain monomeric or oligomeric (meth) acrylic esters of mono- or poly- hydroxy alcohols as well as a peroxide or hydroperoxide. Preferably the alcohols have molecular weights below about 700. To ensure a sufficiently rapid hardening in the absence of oxygen, accelerators are added to the system.

It is known that certain sulfur and/or nitrogen-containing organic compounds can be used as accelerators. With compounds of this type one obtains after a not too long a time a strength which permits the cemented objects to be handled. The strength of the bonds obtained is generally evaluated according to the so-called "hand strength" test. In this test a few drops of the aerostable, anaerobically hardening adhesive composition are applied, for example, to the threads of a degreased bolt, after which the appropriate nut is screwed over the bolt. From time to time, the nut is twisted slightly against the bolt to determined if the adhesive has set. The time that elapses until the nut can no longer be turned by hand is used as the measure of hand strength.

Of greater importance for the use of the anaeriobically hardening adhesives and sealing compounds, however, is the time required for the adhesive on the bolts to withstand a torque of at least 50 kpcm.

RELATED ART

A variety of compositions of the foregoing type are disclosed in U.S. Pat. Nos. 2,626,178; 2,895,950; 3,041,322; 3,043,820; 3,300,547; 3,046,262; 3,218,305; and 3,425,988.

OBJECTS OF THE INVENTION

A principal object of the present invention is to find accelerators for use in adhesive and sealing compositions of the type described which lead very rapidly to a force-locked connection after the parts have been joined together, and yet which have no adverse effect upon the storage stability of the compositions.

A further object of the invention is to provide an aerostable, anaerobically setting adhesive composition comprising a polymerizable (meth) acrylate ester as principal latent adhesive component, a peroxide polymerization catalyst therefor and an agent (an organic sulfonic acid hydrazide) which accelerates the polymerization reaction in the absence of free oxygen, but which is essentially inert in the presence of free oxygen.

A still further object is to provide a method for accelerating the rate at which aerostable, anaerobically-setting compositions containing a polymerizable meth (acrylate) ester as principal latent adhesive component harden in the absence of free oxygen, by uiformly incorporating in said composition a small but effective amount of an organic sulfonic acid hydrazide as agent which accelerates the action of the catalyst or otherwise diminishes the setting time of the adhesive under anaerobic conditions.

BRIEF SUMMARY OF THE INVENTION

The present invention provides an aerostable, anaerobically setting adhesive composition comprising a polymerizable (meth) acrylate ester as principal latent adhesive component, a peroxide polymerization catalyst for the ester, and an organic sulfonic acid hydrazide (or a mixture of one or more organic sulfonic acid hydrazides) as accelerator. The compositions may contain one or more stabilizers and one or more auxiliary accelerators. In preferred embodiments they are adequately stable at room temperature in the presence of free oxygen, but harden rapidly when used as a cement with exclusion of air, and provide strong metal-to-metal bonds.

According to the invention, the new anaerobically hardening adhesives and sealing compounds based on (meth)-acrylic esters contain, in addition to the conventional auxiliary substances, organic sulfonic acid hydrazides, preferably the aromatic sulfonic hydrazides. The sulfonic hydrazides are preferably used in an amount of 0.01% to 10% by weight, particularly 0.1 to 5% by weight based on the weight of the (meth)-acrylic esters.

Practically all aryl- and alkyl sulfonic hydrazides are suitable, provided they are soluble in the acrylic esters in a sufficient amount (i.e., 0.01% to 1% of the weight of the esters) and provided they have no adverse (i.e., destabilizing) effect on the stability of the anaerobic mixtures.

Thus in preferred embodiments the compositions of the present invention contain an adhesive component [e.g., a (meth) acrylate ester]; a polymerization initiator or catalyst (e.g. a hydroperoxy alcohol); an oxygen adjuvant an polymerization inhibitor (e.g., a quinone); a stabilizer (e.g. a percarbonic acid); a primary accelerator (e.g., a tertiary amine); and an auxiliary accelerator (an organic hydrozide). The components are mutually soluble or homogeneously dispersible.

Suitable sulfonic hydrazides derive, for example, from benzene-sulfonic acid, o- and p-toluene-sulfonic acid, $\alpha$- and $\beta$-naphthalene-sulfonic acid, p-chlorobenzenesulfonic acid, p-bromobenzenesulfonic acid, and similar acids. The hydrazides of cyclohexylsulfonic acid, camphorsulfonic acid, and hexadecanesulfonic acid can also be used.

Furthermore the sulfonic hydrazides can be substituted on nitrogen, for example, by alkyl groups, cycloalkyl groups, or by aromatic radicals, such as the phenyl radical.

The alkyl groups (including cycloakyl groups) should be preferably contain 1 to 6 carbon atoms, for example, methyl, ethyl, propyl, isopropyl, butyl, hexyl, cyclopentyl and cyclohexyl groups. Sulfonic hydrazides which are suitable according to the invention are, for example, N,N-Dimethyl-N'-benzenesulfonic acid hydrazide
N-Methyl-N'-benzenesulfonic acid hydrazide
N-Methyl-N'-p-toluenesulfonic acid hydrazide
N,N-Dimethyl-N'-p-toluenesulfonic acid hydrazide
N-Isopropyl-N'-p-toluenesulfonic acid hydrazide
N-Cyclohexyl-N'-p-toluenesulfonic acid hydrazide
N,N-di-n-butyl-N'-p-toluenesulfonic acid hydrazide N-N-Hexyl-N'-p-chlorobenzenesulfonic acid hydrazide N,N-Diethyl-N'-p-chlorobenzenesulfonic acid hydrazide The organic hydrazides according to the invention can be used principally in all so-called anaerobically hardening adhesives and sealing compounds. These systems are composed, for example, of (meth)-acrylic esters of polyhydroxy alcohols having a molecular weight less than about 700, such as ethylene glycol; diethylene glycol; triethylene glycol; tetraethylene glycol; polyethylene glycol; glycerin; pentanediol; di, tri-, or tetrapropylene glycol; or the (meth)- acrylic esters of dimerized or polymerized cyclopentadienol, of tetrahydrofuryl alcohol, of cyclopentanol, or of cyclohexanol. The reaction products of glycide ethers of polyvalent phenols with acrylic acid or methacrylic acid provide another group of anaerobically hardening adhesives.

Another essential component of the anaerobically hardening adhesives are the peroxide initiators. These are primarily hydroperoxides which derive from hydrocarbons with a chain length of 3 to 18 C-atoms. Suitable, for example, are cumene hydroperoxide, tert. butyl hydroperoxide, methylethyl ketone hydroperoxide, and diisopropyl-benzene-hydroperoxide. Furthermore those peroxides are also suitable which have a half life period of 10 hours at a temperature between about 80° and 140°C. Here we mention particularly tert. butyl perbenzoate, di-tert.-butyl-diperoxyphthalate, 2,5-dimethyl-2,5-bis-(tert.-butylperoxy)-hexane, bis-(1-hydroxy-cyclohexyl)-peroxide, tert. butyl-peroxyactetate, 2,5-dimethylhexyl-2,5-di-(peroxybenzoate), tert. butylperoxyisopropyl carbonate, n-butyl-4, 4-bis-(tert.-butylperoxy)-valerate, 2,2-butylperoxy)- butane and di-tert.-butyl peroxide.

The peroxides should be present in an amount of 0.1% to 20%, preferably 1.0% to 10%, based on the total weight of the mixture. They are used mostly as phlegmatized (i.e., thickened) solutions or pastes, that is, with a relatively low content of inert substances, for example, dimethyl phthalate, cumene or the like.

According to a preferred embodiment of the invention, stabilizers are added to the anaerobically hardening mixtures, particularly if they contain arylalkyl- and/or dialkyl hydrazones. The stabilizers prevent premature polymerization; that is, they improve the stability of the compositions during storage. Beyond that, they have an accelerating effect on the polymerization of the methacrylic esters under anaerobic conditions. The stabilizers thus possess a double function. Suitable substances which have these properties are, for example, aliphatic monopercarboxylic acids (particularly peracetic acid) and nitrones, like C-phenyl-N-methyl-nitrone. The use of small amounts (e.g., 0.1% to 5.0% by weight) is generally sufficient.

In addition to the foregoing, the composition may contain a free radical stabilizer, to prevent gelations when oxygen alone is insufficient for the purpose. Quinones (for example, hydroquinone) are preferred stabilizers for this purpose.

As a rule, the stabilizers are added as the last ingredient to the composition.

According to another preferred embodiment of the present invention, an organic amine can be used additionally as an auxiliary accelerator together with the organic hydrazide accelerators according to the invention. In this case the systems show their best properties regarding a rapid hardening time. As auxliary accelerators are mentioned N,N-dimethyl-o-toluidine, N,N-dimethyl-p-toluidine and tri-n-butylamine. They should be used only in very small amounts of 0.1% or up to 2.5% by weight. The auxiliary accelerators are preferably used together with the above-mentioned stabilizers. The amount of stabilizer depends on the quantative ratios between the hydrazides and the auxiliary amine accelerators. They can be easily adapted to each other by simple preliminary tests to obtain an optimum hardening time and good stability.

Finally thickeners, plasticizers, inorganic fillers and dyes can be added to the adhesive and sealing compounds according to the invention. Suitable as thickeners are polymeric compounds such as polymethyl methacrylate, polyethyl acrylate, polystyrene, polyvinyl chloride, synthetic rubber and the like. As fillers can be used, for example, finely-divided silicon dioxide, silicates, bentonites calcium carbonate, and titanium dioxide.

The anaerobic adhesives and sealing compounds according to the invention can be stored for months in only partly-filled bottles of glass, polyethylene, etc., without undergoing any change. A relatively low oxygen-partial pressure suffices to inhibit the polymerization. Here as well as in other cases it was found expedient to color the bottles to keep out short-wave light. This has a favorable effect on the stability.

The anaerobicaly-hardening adhesives are used in the industry for cementing metal sheets or metal parts of different materials or for fastening threads, for sealing pipe joints, etc. Due to the combination according to the invention it is not necessary to use an additional accelerator, even with relatively inactive metal surfaces. Naturally it is also possible to accelerate the hardening with known means, for example, by slight heating.

In general, so-called hand-resistant joints are obtained after a few minutes with the anaerobic adhesives according to the invention. It should be pointed out that the time to obtain a really good strength which permits practical handling, namely, to obtain a bond which withstands a torque of at least 50 kpcm, is between about 10 and 30 minutes.

In the specification and claims, the term "(meth) acrylate" is used to designate esters of acrylic acid and the esters of methacrylic acid. The esters are termed latent adhesives because they do not develop their adhesive properties until they have polymerized.

The invention is further described in the examples which follow. These examples are preferred embodiments of the invention and are not to be construed in limitation thereof.

EXAMPLES 1 to 10

100 g of technical polyethylene glycol dimethacrylate (m.w. approx. 330), which contained 200 p.p.m. of hydroquinone, was mixed under stirring with the amounts of sulfonic acid hydrazide indicated in column 2 of Table 1 below. Subsequently 1.1 g of N,N-dimethyl-p-toluidine was added to the mixtures of Examples 4 to 9. Then 5.5 g of a commercial 70% cumene hydroperoxide solution was added. In the case of Examples 4 to 9, as a last component was added the amount of 408c % commercial peracetic acid in glacial acetic acid indicated in Col. 3.

TABLE I

| Ex. | Hydrazide Added | | Stabilizer Added | |
|---|---|---|---|---|
| 1 | 0.5 g | p-Toluene sulfonic hydrazide | — | |
| 2 | 0.5 g | Benzene sulfonic hydrazide | — | |
| 3 | 1.0 g | p-Toluene sulfonic hydrazide | — | |
| 4 | 0.5 g | Benzene sulfonic hydrazide | 0.5 g | Peracetic acid |
| 5 | 0.5 g | Benzene sulfonic hydrazide | 1.0 g | Peracetic acid |
| 6 | 0.25 g | " | 0.5 g | " |
| 7 | 0.25 g | " | 0.25 g | " |
| 8 | 1.0 g | p-Toluene sulfonic hydrazide | 1.0 g | " |
| 9 | 0.5 g | " | 0.5 g | " |
| 10 | 0.25 g | N-Methyl-N'-p-toluene sulfonic hydrazide | — | |

The products of Examples 1 to 14 were tested for:
A. Hand strength
B. Time to resist a torsional force of 50 kpcm
C. Strength after 24 hours
D. Stability A. Hand Strength Test In the hand strength test a few drops of the anaerobically hardening adhesive are placed on the threads of a degreased bolt (M 10 × 30 DIN 933-8.8 and the appropriate nut is screwed over the bolt. From time to time the nut is turned a little against the bolt, to determine at what time the nut can no longer be turned by hand on the bolt. The elapse time is used as a measure of the hand strength and is shown in Table 2 below.

B. Time for attaining a Torque of at least 50 kpcm

The strength test is carried out on degreased bolts (M 10 × 30 DIN 933-8.8)

and nuts. After the bolt has been joined to the nut with a few drops of the adhesive the torque necessary to break the adhesive joint is determined with a torque wrench at intervals of several minutes. As measure for the strength is considered the time at which a torque of 50 kpcm or more is obtained. Mean values of five measurements are listed in column 3 of Table 2.

C. Strength After 24 hours

The torque is kpcm required to break the adhesive bond between the nut and bolt after 24 hours of storage at room temperature was determined with a torque wrench. It is listed in column 4 of Table 2 below.

D. Stability

In the stability test, a test tube 10 cm. long and 10 mm wide was 9/10 filled with the mixture according to Example 1 to 12 and suspended in a bath maintained at 80°C. The time span from the hanging in the bath to the first formation of gel was measured. All samples were still gel-free after one hour. The values respecting the hand strength, the time of the 50 kpcm strength and the strength after 24 hours were unchanged. The accelerated aging test was stopped, because this test shows that the products remain unchanged for over a year at room temperature.

TABLE 2

| Ex. | Hand Strength (minutes) | 50 kpcm Torque (minutes) | Strength after 24 hours (kpcm) |
|---|---|---|---|
| 1 | 3 | 15 | 140 |
| 2 | 3 | 15 | 180 |
| 3 | 2 | 15 | 180 |
| 4 | 2 | 10 | 140 |
| 5 | 2 | 15 | 140 |
| 6 | 2 | 15 | 120 |
| 7 | 2 | 30 | 120 |
| 8 | 3 | 10 | 160 |
| 9 | 3 | 10 | 140 |
| 10 | 3 | 20 | 140 |

Comparison of the results obtained with the composition of Example 10 (which contained no stabilizer) with the results obtained with the other compositions (which contained stabilizer) shows that the stabilizer had little or no effect on the accelerating action of the hydrazones or on the ultimate strength developed by the compositions.

We claim:

1. In an aerostable, anaerobically-setting adhesive composition containing a polymerizable (meth) acrylate ester as principal latent adhesive component, an effective amount, in the range of 0.1% or 20% by weight, of a hydroperoxide polymerization catalyst therefor derived from hydrocarbons containing a $C_3$-$C_{18}$ chain, and an accelerator for said catalyst, a small but effective uniformly distributed amount in the range of 0.01% to 10% of the weight of said ester of an organic sulfonic acid hydrazide which is soluble in said ester to the extent of at least 0.01% to 1% by weight and which has substantially no destabilizing effect on said composition as auxiliary accelerator.

2. A composition according to claim 1 wherein the auxiliary accelerator is benzenesulfonic acid hydrazide.

3. A composition according to claim 1 wherein the accelerator is p-toluenesulfonic acid hydrazide.

4. A composition according to claim 1 wherein the principal accelerator is N,N-dimethyltoluidine.

5. A composition according to claim 1 wherein the (meth) acrylate ester is the ester of two mols of meth acrylic acid with one mol of ethylene glycol.

6. A composition according to claim 1 wherein the polymerization catalyst is cumene hydroperoxide.

7. A composition according to claim 1 wherein the composition contains a stabilizer.

8. A composition according to claim 1 containing a free radical stabilizer.

9. A composition according to claim 8 wherein the free radical stabilizer is hydroquinone.

10. A composition according to claim 9 wherein the stabilizer is peracetic acid.

11. A composition according to claim 9 wherein the supplementary stabilizer is N-methyl-C-phenyl nitrone.

12. A method for accelerating the setting rate of an aerostable, anaerobically-setting adhesive composition comprising a polymerizable (meth) acrylate ester as principal latent adhesive component, and an effective amount, in the range of 0.1% to 20% by weight, of a hydroperoxide polymerization catalyst therefor derived from hydrocarbons containing a $C_3$–$C_{18}$ chain, and an accelerator for said catalyst, which comprises uniformly incorporating in said composition a small but effective amount in the range of 0.01% to 10% of the weight of said ester of an organic hydrazide which is soluble in said ester to the extent of at least 0.01% to 1% by weight and which has substantially no destabilizing effect on said composition as auxiliary accelerator.

13. A method according to claim 12 wherein said hydrazide is incorporated in said composition prior to said catalyst and said basic amine.

14. A composition according to claim 1, wherein the auxiliary accelerator is an arylsulfonic hydrazide.

15. A composition according to claim 1 wherein the auxiliary accelerator is an alkylsulfonic hydrazide.

* * * * *